United States Patent [19]
Bond

[11] Patent Number: 5,544,199
[45] Date of Patent: Aug. 6, 1996

[54] NON-ADAPTIVE PHASE-DIFFERENCE INTERFERENCE FILTER

[75] Inventor: James W. Bond, San Diego, Calif.

[73] Assignee: The United States of America as represented by the Secretary of the Navy, Washington, D.C.

[21] Appl. No.: 713,660

[22] Filed: Jun. 11, 1991

[51] Int. Cl.$^6$ .......................... H04B 15/00; G06F 17/10
[52] U.S. Cl. .......................... 375/285; 375/200; 375/346; 375/350; 364/724.01
[58] Field of Search .................................. 375/1, 51, 57, 375/58, 99, 103, 200–210, 278, 284, 285, 346, 350; 380/34; 364/724.01

[56] References Cited

U.S. PATENT DOCUMENTS 4,953,184  8/1990  Simone .................................. 375/103

OTHER PUBLICATIONS

J. Bond et al, "Adaptive Locally Optimum Detection Based Upon Kernel Estimation"; (Naval Ocean Systems Center, San Diego; Technical Report 1307, Aug. 1989).

Primary Examiner—Bernarr E. Gregory
Attorney, Agent, or Firm—Harvey Fendelman; Thomas Glenn Keough; Peter A. Lipovsky

[57] ABSTRACT

An interference suppression system utilizes a non-adaptive filter to suppress interference from bandspread communication signals. The filter is effective in the cancellation of interference from a bandspread communication signal when the interference dominates the communication signal and Gaussian noise.

This invention requires a processor without highly specialized hardware components. The components are cheaper and easier to produce because the required processor needs to perform fewer calculations by several orders of magnitude than previously existing processors providing roughly equivalent interference suppression.

By forming phase-differences, the filter is used to estimate whether the signed magnitude of a component of a communication signal phase difference is either 90° or 270° out-of-phase with interference. By estimating this component, high quality reception of spread spectrum radio communication signals in an interference environment is possible.

8 Claims, 8 Drawing Sheets

NON-ADAPTIVE PHASE-DIFFERENCE INTERFERENCE FILTER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This application is related to the U.S. patent application titled: "Non-adaptive Amplitude-Difference Interference Filter" by inventor James W. Bond filed Jun. 11, 1991 and identified as Ser. No. 07/713,659.

BACKGROUND OF THE INVENTION

1. Field of the Invention

This invention relates generally to the suppression of interference among communication signals. More particularly, the invention relates to the implementation of statistical techniques to interference suppression.

2. Description of the Related Art

Radios may receive three forms of signals: noise, interference and communication. Noise, created in the atmosphere due to natural causes such as lightning and the like, is unpredictable. Few steps are taken toward its elimination. Interference signals can be caused inadvertently, such as by several stations broadcasting on the same band, or can be caused deliberately, such as by an adversary transmitting signals to mask communication signals. Many techniques have been devised to combat interference.

As major sources of radio interference are non-Gaussian in structure, receivers effective in detecting communication signals in the presence of non-Gaussian interference have been known to estimate the statistics of this interference. This estimate is then used to transform received radio signals into perceptible communication signals.

Adaptive filters have been used to perform the above functions. One adaptive filtering technique creates a transform based upon the derivative of the natural log of the probability density function (PDF) of an interference magnitude, such as signal amplitude. For sampled data, an estimation of the PDF has traditionally been obtained through estimation of a cumulative probability function of the data. Derivatives have been calculated using finite difference operations.

Such adaptive filtering techniques can be computationally complex, incapable of performing in real-time, and numerically unstable. To perform satisfactorily, these techniques often require a relatively great number of signal samples. This high sample requirement makes some adaptive approaches computationally demanding and confines their use to dedicated microprocessors, and then primarily those used with radios operating in the lower portion of the radio frequency spectrum (low frequency [LF], very low frequency [VLF], and extra low frequency [ELF]).

Though successful interference suppression has been obtained through the use of adaptive filters, such filtering devices use a great many calculations and require considerable processing. Their complex design has led to interference processors of high cost.

There is thus a need for an interference suppression system that can be used with dedicated or nondedicated microprocessors, that is suitable for use with radio frequency receivers operating over both the lower and upper portions of the radio frequency spectrum and that is relatively simple in operation, permitting interference suppression at a reasonable cost.

SUMMARY OF THE INVENTION

The invention meets these needs by providing a simpler, non-adaptive filter that can be used in place of adaptive filters. This non-adaptive filter provides similar performance to adaptive filters for many kinds of interference suppression including the suppression of interference from bandpass communication signals where interference consists of combinations of narrowband interferers.

The non-adaptive phase-difference interference filter of the invention is effective in the cancellation of interference from a band-spread communication signal whenever the interference has a mean component which is several times greater than its variable component. The filter of the invention is particularly well-suited but is not limited to the cancellation of multiple high frequency (HF) voice channels (narrowband) from a band-spread HF communication signal (broadband).

The filter operates through the determination of a sequence of signal phase-differences derived from individual samples of a received signal. By using statistical techniques, the phase differences are used to estimate the signed magnitude of a component of the communication signal.

This estimation provides a basis for determining whether the component of the signal phase difference is 90° or 270° out-of-phase with received interference. By making this estimation, high quality reception of a spread spectrum radio signal in an interference environment is possible.

OBJECTS OF THE INVENTION

It is an object of the invention to provide an improved interference suppression system.

Another object of the invention is to provide an interference suppression system that can be implemented through the use of dedicated or nondedicated microprocessors.

A further object of the invention is to provide an improved interference suppression system that is operable in both the lower and upper portions of the radio frequency spectrum.

Yet a further object of the invention is to provide a computationally simple interference suppression filter.

Yet another object of the invention is to provide an interference suppression filter that is relatively inexpensive.

Other objects, advantages and new features of the invention will become apparent from the following detailed description of the invention when considered in conjunction with the accompanying drawings.

DESCRIPTION OF THE PREFERRED EMBODIMENT

Figure 1:
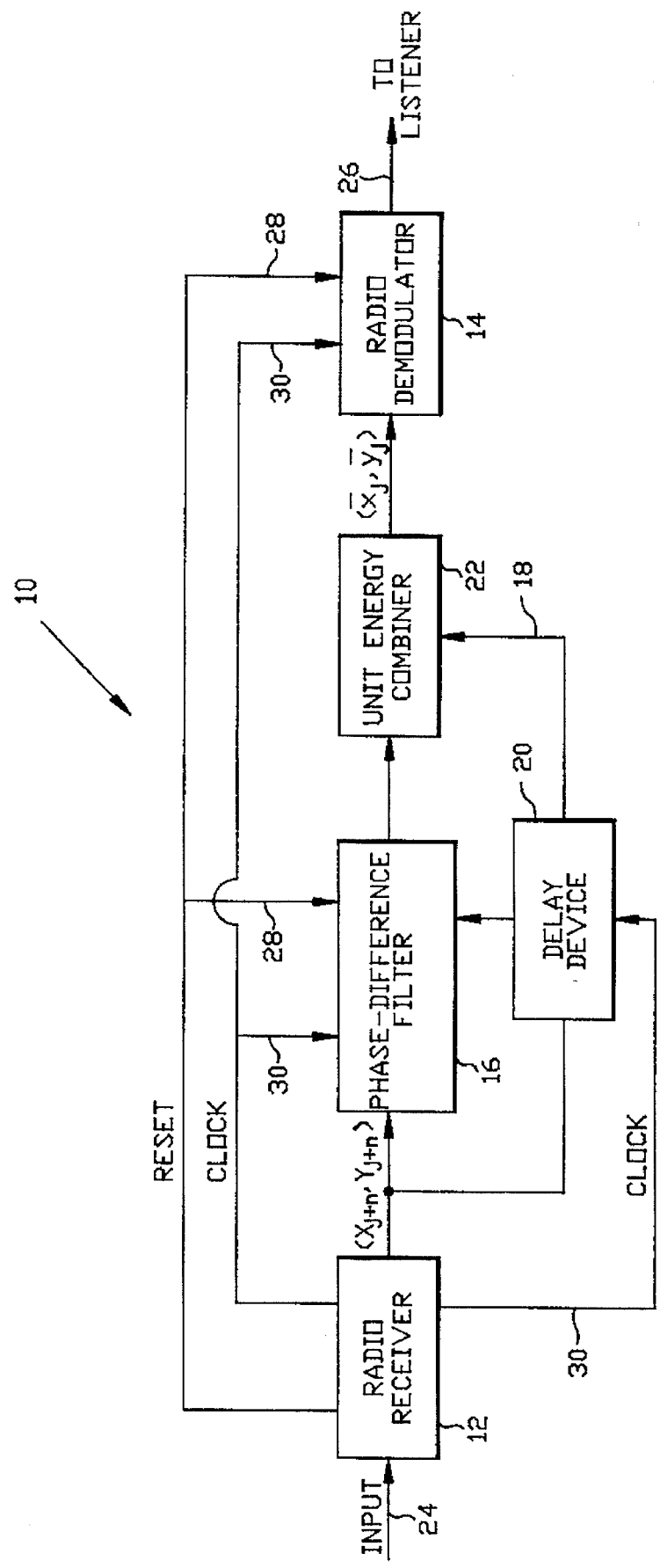
FIG. 1 is a block diagram of an interference suppression system according to the invention.

In FIG. 1 there is shown an interference suppression system 10 according to a preferred embodiment of the invention. System 10 includes components of a typical radio including a receiver 12 and a demodulator 14. As a stand-alone processor, a non-adaptive phase-difference filter 16 according to the invention is inserted between receiver 12 and modulator 14 as shown.

To provide satisfactory performance in cases where interfering noise is primarily Gaussian, phase-difference filter 16 should be used in conjunction with a bleed-through path 18. This path includes a delay 20 that equals the delay through processor 16. Signals delayed through bleed-through path 18 and those output from processor 16 are normalized and combined conventionally in combiner 22. Normalization for signals passed through bleed-through path 18 is with respect to the corresponding magnitudes (amplitudes) of the individual samples used in system 10.

Bleed-through path 18 and combiner 22 are needed for the invention to work properly in cases where communication signals are nearly as strong or are stronger than noise and interference. This path is constantly employed and has little effect on system operations until the described conditions take place.

A preferred embodiment of the invention is designed for the reception of band-spread signals having each information bit spread by a factor of 10 or more. Of course, other spread factors may be used. For the invention to perform satisfactorily, radio 12 must include a bypass of processor 16 for the reception of communication signals which are not spread. This bypass, not shown, may be constructed according to conventional techniques.

Radio receiver 12 converts input signals 24 into a sequence of in-phase and quadrature samples $\{x_j\}$ and $\{y_j\}$, respectively, with j being an arbitrary index. Input pair $(x_j,y_j)$ is called a complex sample of the received signal for index j and can be viewed as a vector with x-component $(x_j)$ and y-component $(y_j)$. According to this description, signals $x_j$ and $y_j$ are the centermost pair of a representative number (2n+1) or sequence of received signal samples taken: $(x_{j-n}, Y_{j-n}) \ldots (x_j,y_j) \ldots (x_{j+n}, y_{j+n})$. The preferred sample rate used is twice the bandwidth of the baseband communication signal components received by radio 12.

Demodulated output 26 of system 10 is of a sequence of "transformed" in-phase and quadrature samples designated as $\{x_j\#\}$ and $\{y_j\#\}$, respectively. A reset signal 28 and a clock signal 30, both derived from radio 12, are used to synchronize operation of processor 16 with radio receiver 12 and demodulator 14.

Let $r_j^2 = x_j^2 + y_j^2$ with $r_j > 0$ and being a magnitude, in this case the amplitude, of received input sample pair $(x_j,y_j)$. Let $\Delta\Theta_j = \Theta_j - \Theta_{j-d}$, with d being a positive integer, and $\Theta_j$ being the phase of the received signal, namely $\Theta_j = \arctan(y_j/x_j)$ with $\Theta = (\text{sign of } y_j)\pi/2$ when $x_j = 0$ and $\Theta_{j-d}$ being the phase so computed of a previous signal sample that is d samples previous to sample j. In this case the variable d should be chosen so that the sample pairs $(x_j,y_j)$ and $(x_{j-d},y_{j-d})$ have virtually uncorrelated signal components. For example, if the samples are taken at the chip rate of the communication signal spreading sequence then d can be taken as 1 or ½. For the given equation the phase-difference should be expressed in radians, not in degrees.

The processor shown in FIG. 1 forms a gain factor $g(\Delta\Theta_j)$ which relates the input sequence $\{x_j,y_j\}$ to demodulated output sequence $\{x_j\#,y_j\#\}$ by the relation:

$$(x_j\#, y_j\#) = g(\Delta\Theta_j)(-y_j, x_j).$$

The gain factor $g(\Delta\Theta_j)$ is not only a function of $\Delta\Theta_j$ but of $\{\Delta\Theta_k, \Theta_j | j-n \leq k \leq j+n\}$, with 2n+1 being the representative number of samples used in processor 16. As will be further discussed, a value of n equaling a power of 2 has been found to simplify implementation of the invention. It should be noted that n, however, is an arbitrary number that may be adjusted according to user demand and results achieved.

For example, for the very low frequency (VLF) band, simulation of the invention has provided marginal performance for n=2 and better performance for n=8. Depending on the radio used and its frequency of operation as well as the nature of the interference, allowable values of n starting with 2 to the first power and increasing to greater powers should be tried until performance levels off.

The processing taking place in the invention delays output 26 relative to input 24 by at least n samples. Delay 20 should be the same as this delay. Demodulator 14 should be modified in a conventional way to account for this delay to allow for the despreading of processed communication signals.

Figure 2:
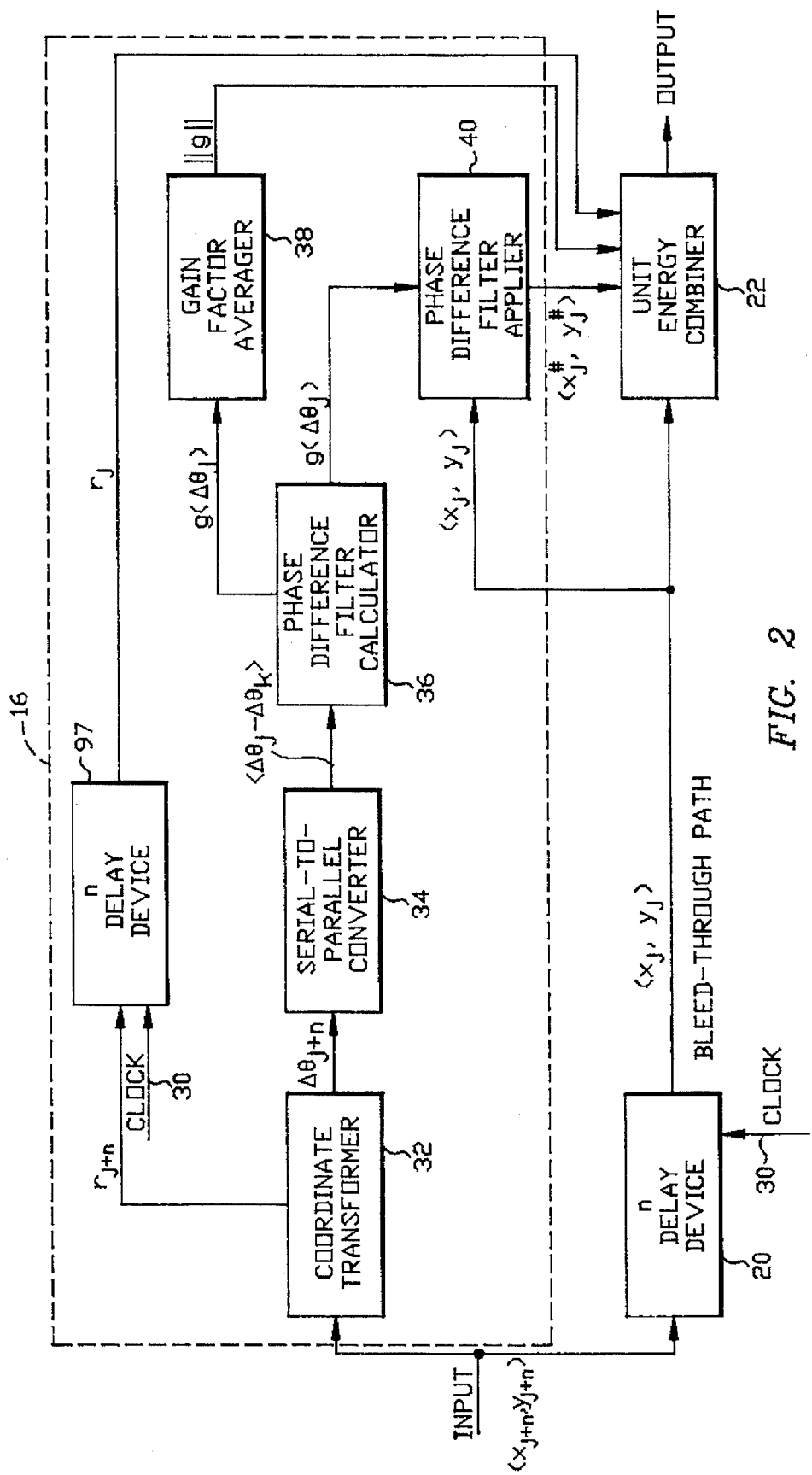
FIG. 2 shows a representative implementation of an interference filter according to the invention.

In FIG. 2 there is provided a general block diagram showing the major components of non-adaptive phase-difference filter 16 as well as unit energy combiner 22 and time delay 20. In the preferred embodiment shown, all input and output quantities are 16-bit integers and all calculations performed by the components of the filter of the invention are done with 16-bit or more precision. Of course, those skilled in the art will realize that these quantities may be changed depending upon component availability, computation time required and/or other factors.

The invention will be described at three levels. First, the inputs and outputs will be described for each major functional block of FIG. 2. Second, the hardware and functions of each block, whose properties are not apparent, will be described. Third, a flow chart procedure will be described outlining processing steps taking place in the invention.

The inputs and outputs of each of the major functional blocks shown in FIG. 2 are given below.

Coordinate Transformer (32):

Input: $(x_{j+n}, y_{j+n})$

Output: $\Delta\Theta_{j+n}, r_{j+n}$

The "j+n"th sample pair is the most recently acquired sample of a sample sequence $\{x_j,y_j\}$ and is shown in FIG. 2 as the input into processor 16. Since the invention cancels interference based upon properties of the received signal samples, in this example signal amplitude and phase difference, coordinate transformer 32 calculates these properties. It should be noted that sample magnitude $r_{j+n} = \sqrt{x_{j+n}^2 + y_{j+n}^2}$ unless this quantity is 0. Then $r_{j+n}$ equals the smallest number expressible in the arithmetic of the utilized machine such tha $$\frac{1}{r_{j+n}}$$

will not overflow arithmetic capacity.

Serial-to-parallel Converter (34):

Input: the sequence of real numbers $\{\Delta\Theta_j\}$ input over time (including $\Delta\Theta_{j+n}$), reset and clock signal.

Output: a sequence of vectors centered about the reference sample phase-difference $\Delta\Theta_j$, which is written as $$\langle\Delta\theta_j - \Delta\theta_k\rangle = (\Delta\theta_j - \Delta\theta_{j-n}, \Delta\theta_j - \Delta\theta_{j-(n-1)}, \ldots,$$
$$\Delta\theta_j - \Delta\theta_{j-1}, \Delta\theta_j - \Delta\theta_{j+1}, \ldots,$$
$$\Delta\theta_j - \Delta\theta_{j+n})$$

in which throughout the specification "<>" designates a vector form of the received signals with symbol "k" representing a running index based upon j that runs from j−n to j+n unless otherwise noted. This sequence of signal phase differences is used to calculate the transform to be applied to samples processed in phase-difference filter 16.

Phase-difference Filter Calculator (36):

Input: $\langle\Delta\Theta_j - \Delta\Theta_k\rangle$

Output: $g(\Delta\Theta_j)$

Gain Factor Averager (38):

Input: $g(\Delta\Theta_j)$

Output: $\|g\|$

Phase-difference Filter Applier (40):

Input: $g(\Delta\Theta_j)$, $(x_j, y_j)$

Output: $(x_j\#, y_j\#) = (-g(\Delta\Theta_j)y_j, g(\Delta\Theta_j)x_j)$

Unit Energy Combiner (22):

Input: $(x_j, y_j)$, $(x_j\#, y_j\#)$, $r_j$, $\|g\|$

Output: $(\bar{x}, \bar{y}_j)$

Unit Energy Combiner 22 and time delay 20 do not form a part of Non-adaptive Phase-difference Filter 16 but are shown in FIG. 2 to facilitate understanding of the invention.

The hardware and operation of each of the block diagram components shown in FIG. 2 will now be described. The components shown are assembled from conventional elements according to traditional techniques.

Figure 3:
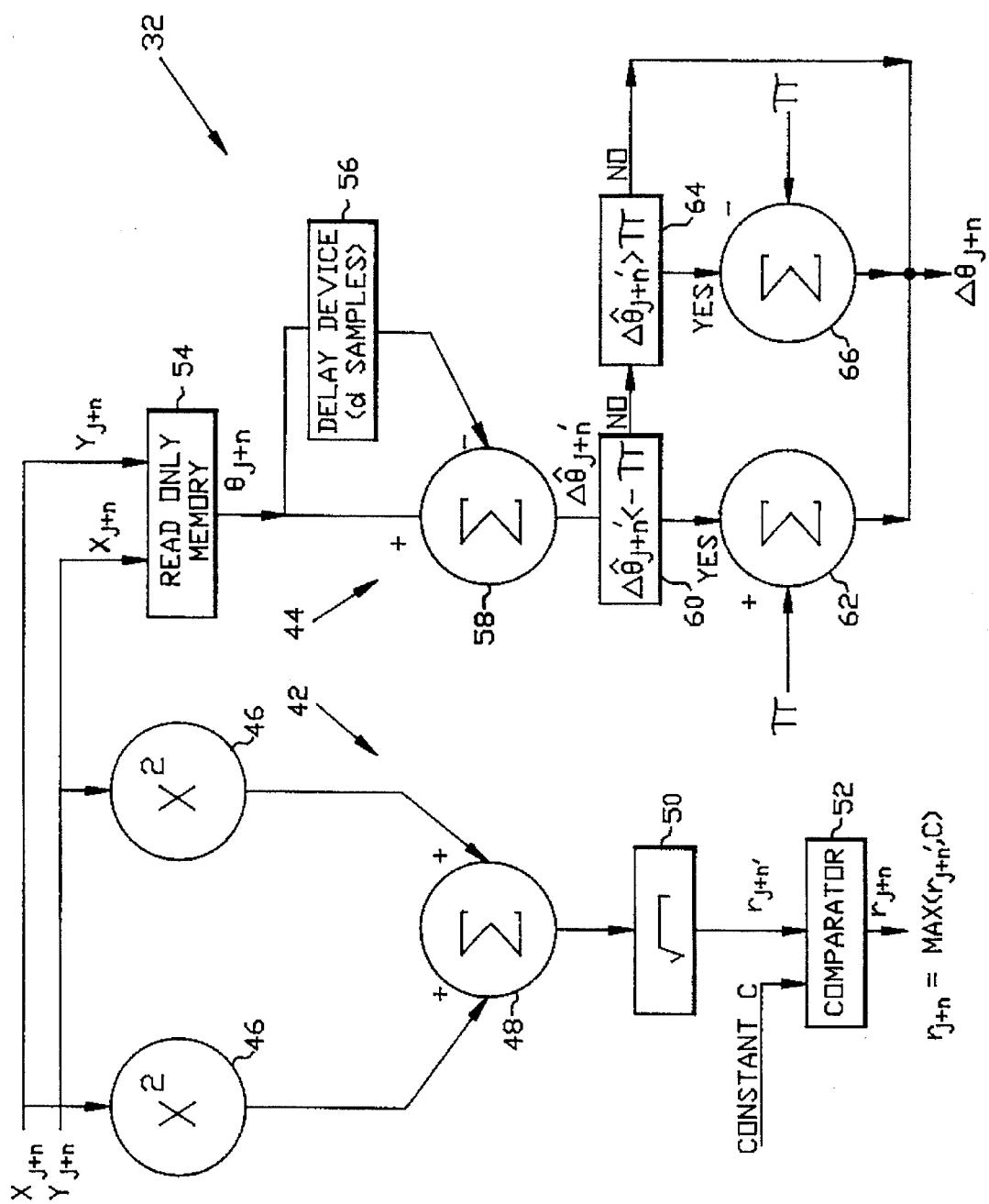
FIG. 3 is a block diagram of a coordinate transformer such as may be used in a representative embodiment of the invention.

Coordinate Transformer (32):

Coordinate Transformer 32 shown in FIG. 2 is shown in detail in FIG. 3. Transformer 32 is broken into signal magnitude 42 and signal phase 44 sections. In section 42 it can be seen that each component of input sample $(x_{j+n}, y_{j+n})$ goes to its individual squaring circuit 46. The outputs of squaring circuits 46 are added in summer 48. In square root circuit 50 the square root of the output of summer 48 is taken to give $r_{j+n}'$.

To prevent $r_{j+n}'$ from falling below a preselected value (constant C), $r_{j+n}'$ is compared with constant C in comparator 52 according to the equation $r_{j+n} = \text{MAX}(r_{j+n}', C)$ to output a controlled $r_{j+n}$ from the comparator. As previously mentioned, $r_{j+n}$ is a non-negative number that is the magnitude (amplitude) of the most recently acquired input sample pair $(x_{j+n}, y_{j+n})$.

In signal phase section 44 the sequence of vectors $\langle x_j, y_j\rangle$, of which $(x_{j+n}, y_{j+n})$ is a part, is used to address a read-only memory 54. For each of the vectors addressing memory 54, there is a principal value of arctan $(y_j/x_j)$ stored and output from the memory. For the particular vector $\langle x_{j+n}, y_{j+n}\rangle$, the value of arctan $(y_{j+n}/x_{j+n})$ will be stored at the $(x_{j+n}, y_{j+n})$ address. Delay 56 permits the value of $\Theta_{j+n-d}$ to be subtracted from the output of memory 54 in summer 58 to provide $\Delta\hat{\Theta}_{j+n}'$. This difference may not fall between $-\pi$ and $\pi$ and therefore it is compared in logic circuitry with these values and adjusted if necessary.

Towards this end the value of $\Delta\hat{}_{j+n}'$ is input into comparator 60 which is labeled as "$\Delta\hat{}_{j+n}' < \pi$". If the input to this comparator is less than $-\pi$, the output of comparator 60 is routed to an adder 62 which adds $\pi$ to it and passes this on as output $\Delta\hat{\Theta}_{j+n}$. If input to logic circuit 60 is greater than $-\pi$ then the output of comparator 60 is routed to a second comparator 64 which is labeled as "$\Delta\hat{\Theta}_{j+n}' > \pi$". If the input to comparator 64 is greater than $\pi$, then its output is routed to adder 66 which subtracts $\pi$ from the comparator's output, this being passed on as output $\Delta\Theta_{j+n}$. If the output of comparator 64 is less than $\pi$, then it is routed directly to output $\Delta\Theta_{j+n}$ of coordinate transformer 32.

Figure 4:
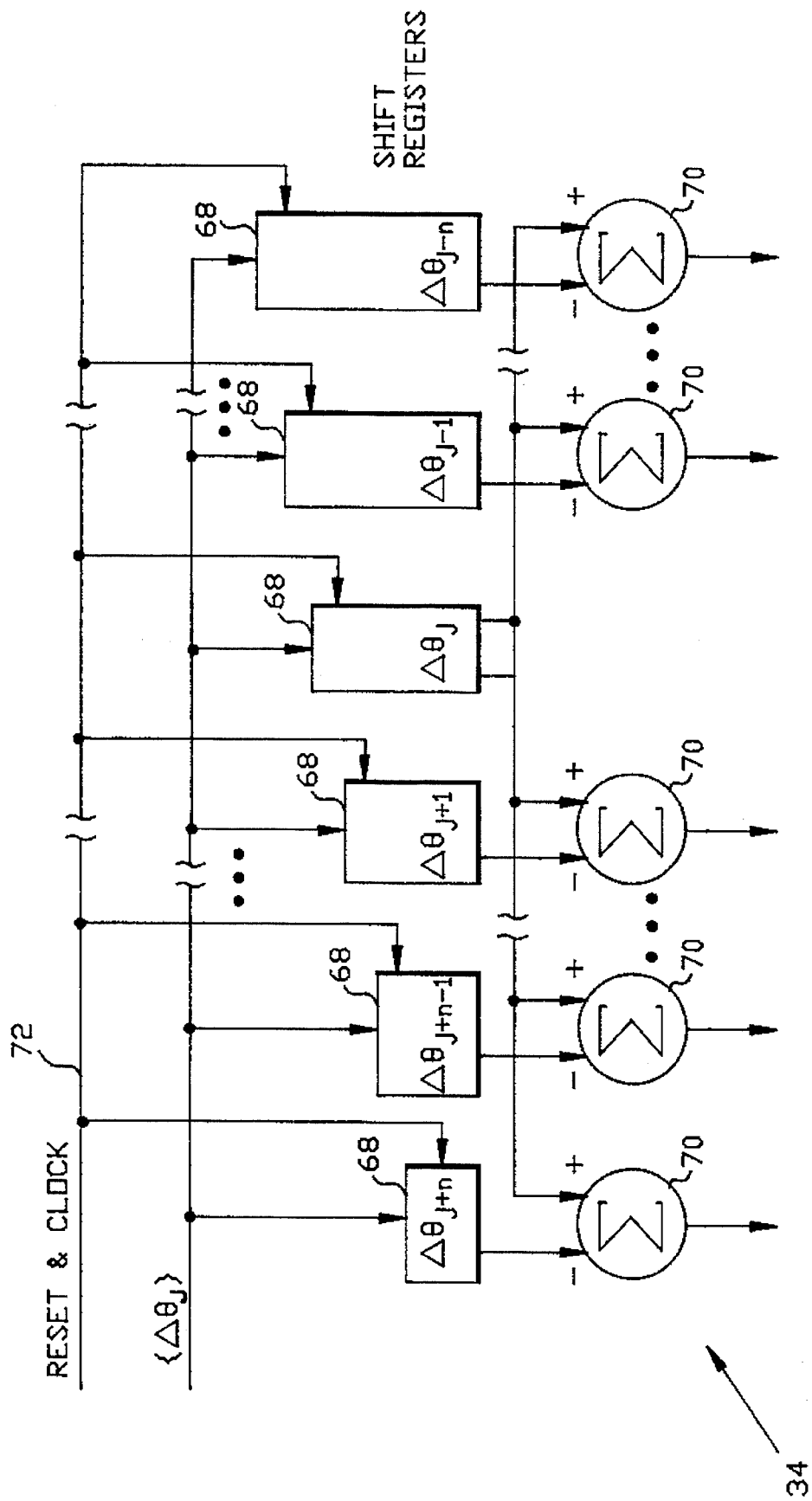
FIG. 4 is a block diagram of a serial-to-parallel converter such as may be used in the invention.

Serial-to-parallel Converter (34):

Serial-to-parallel Converter 34 shown in FIG. 2 is shown in greater detail in FIG. 4. The input to Serial-to-parallel Converter 34 is the sequence of phase differences $\{\Delta\Theta_j\}$ with its output being $\langle\Delta\Theta_j - \Delta\Theta_k\rangle$. This output vector has 2n terms and is formed by subtracting from the middle phase difference of 2n+1 successive input phase-differences, reference phase difference $\Delta\Theta_j$, the n input phase-differences on each side of it.

Serial-to-parallel Converter 34 can be seen to contain 2n+1 shift registers 68 of length 1 through 2n+1. The outputs of these shift registers are fed to 2n adders 70 to create the phase-differences $\Delta\Theta_j - \Delta\Theta_k$, with $k = j-n, \ldots, j-1, j+1, \ldots, j+n$. Line 72 includes reset signal 28 of FIG. 1 to reset the contents of shift registers 68 to 0. This reinitializes the data used in processor 16 when an operably coupled radio is tuned to a new frequency.

Figure 5:
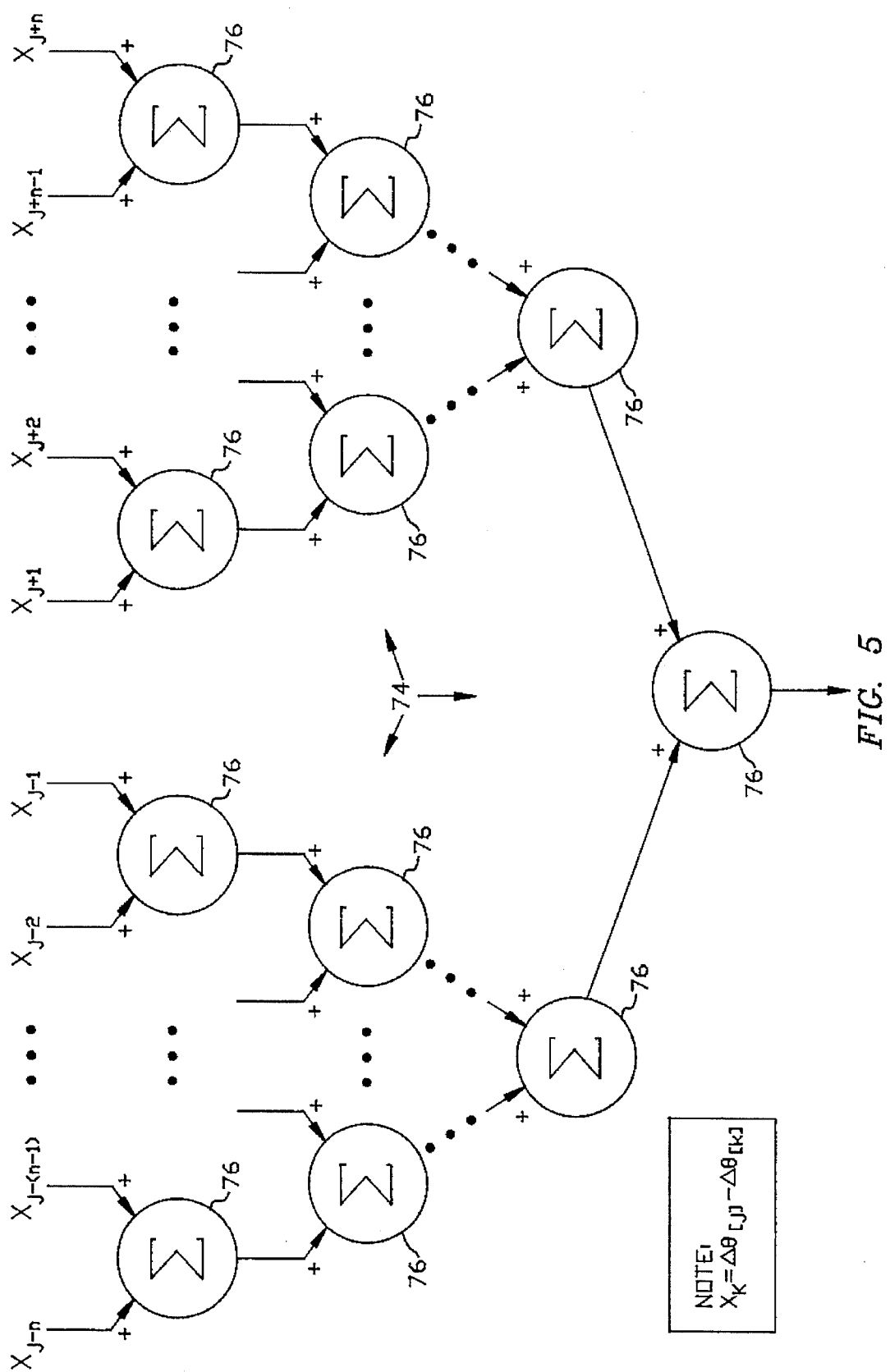
FIG. 5 is a diagrammatical representation of a summing network according to the invention.

Phase-difference Filter Calculator (36):

The details of Phase-difference Filter Calculator 36 of FIG. 2 are shown in FIG. 5. Calculator 36 uses a summing network 74 to form:

$$g(\Delta\theta_j) = \sum_k [\Delta\theta_j - \Delta\theta_k] \text{ for } k = j - n \text{ to } k = j + n.$$

The inputs to the first or top row of adders 76 are the components of vector $\langle\Delta\Theta_j - \Delta\Theta_k\rangle$ shown as $x_k$ in FIG. 5.

The orderly summing network shown in FIG. 5 terminates as indicated because n is a power of 2. For example, when n=8, 16 inputs to the eight adders of the first or top row of network 74 leads to eight inputs to the four adders in the second row of the network, to four inputs to two adders in the third row of the network, to two inputs to the single adder in the last or bottom row of network 74.

Generally, if $n = 2^m$, summing network 74 will consist of m rows of adders with $2^{m-1}$ adders in the top row, $2^{m-2}$ adders in the second row, . . . , one adder in the mth row which contains the two variable inputs from the m-1th row.

Figure 6:
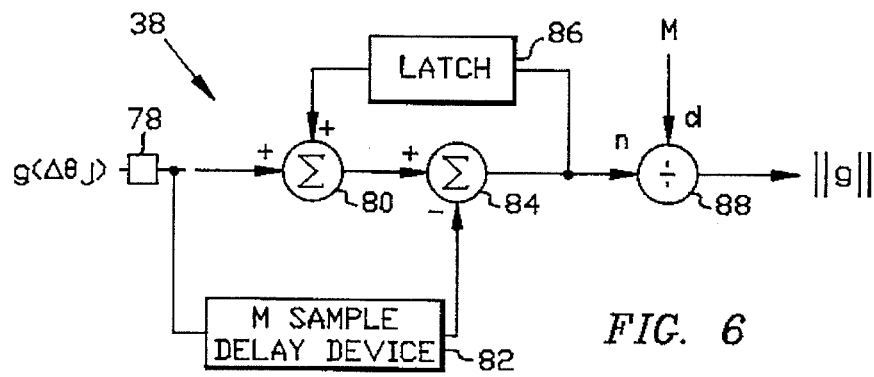
FIG. 6 is a block diagram of a gain factor averager such as may be used in the invention.

Gain Factor Averager (38):

Gain Factor Averager (38), shown in FIG. 2 is shown in greater detail in FIG. 6. As can be seen in FIG. 6, the Gain Factor $g(\Delta\Theta_j)$ from phase difference filter calculator 36 of FIG. 2 is input into an absolute value component 78 to calculate the absolute value of $g(\Delta\Theta_j)$.

The output of absolute value component 78 is passed to a summer 80 and an M sample delay 82, the output of these being summed in a summer 84 and recirculated by way of latch 86 to be summed with new inputs in summer 80. The succession of values added by summers 80 and 84 are eventually passed to divider 88 where 1/M is multiplied times summer 84's output, resulting in ||g||, the average value of gain factor g(ΔΘ$_j$) over a period of M samples of (2n+1) samples per sequence. Gain Factor Averager performs the calculatio $$\|g\| = \frac{1}{M} \sum_{i=j}^{j-M} g(\Delta\theta_i).$$

. In this case M is determined by the user. For very low frequencies (VLF) a value of M=100 can be used for satisfactory results.

Figure 7:
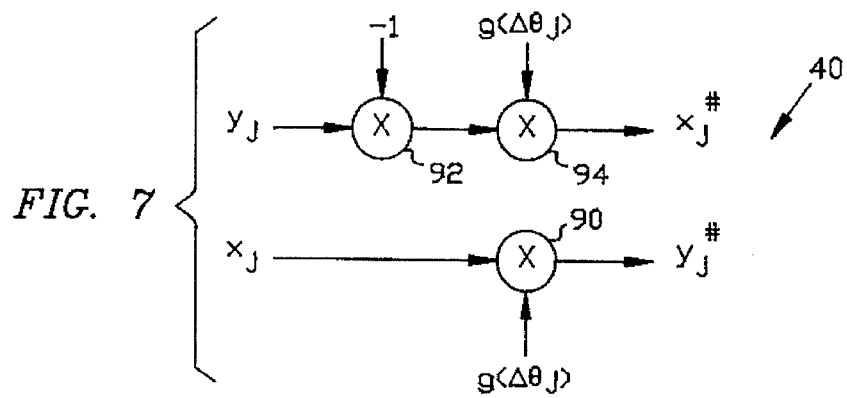
FIG. 7 is a phase-difference applier according to the invention.

Phase-difference Filter Applier (40):

Filter Applier (40) includes two multiplication schemes. Referring to FIGS. 2 and 7, in one of these schemes sample input x$_j$ is multiplied by the output of Phase-difference Filter Calculator 36 (g(ΔΘ$_j$)) in a multiplier 90 resulting in transformed signal output y$_j$#. Similarly, –y$_j$ from multiplier 92 is multiplied by g(ΔΘ$_j$) in multiplier 94 to produce transformed signal output x$_j$#.

Sample pair (x$_j$,y$_j$) input into Phase-difference Filter Applier (40) is delayed in delay 20 to match the delay introduced by the phase difference filtering of the invention.

Figure 8:
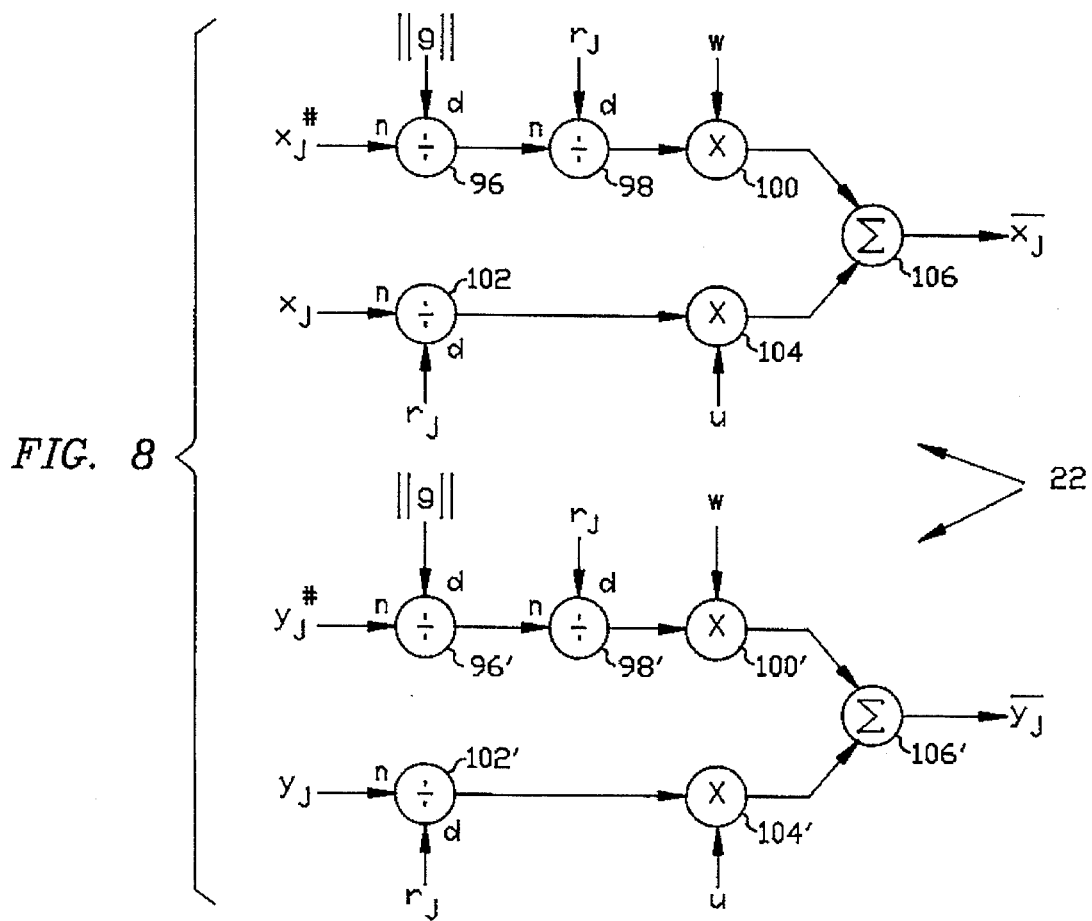
FIG. 8 is a unit energy combiner as may be utilized in the invention.

Unit Energy Combiner (22):

Unit Energy Combiner (22) shown in FIG. 2 is also shown in detail in FIG. 8. In FIG. 8 it can be seen that transformed signal samples x$_j$# and y$_j$# are individually ratioed with average gain factor ||g|| in dividers 96 and 96', respectively. The outputs are then ratioed with the corresponding sample magnitude r$_j$, from delay 97, in dividers 98 and 98', respectively. The output of these dividers are then multiplied by weight w in multipliers 100 and 100', respectively In a similar fashion input sample components x$_j$ and y$_j$ are ratioed with sample magnitude r$_j$ in dividers 102 and 102', respectively. The output of these dividers are then multiplied by weight u in multipliers 104 and 104', respectively. Weight adjusted "x" components are then added in adder 106 to produce Unit Energy Combiner (22) "x" output component $\bar{x}_j$. Likewise, weight adjusted "y" components are added in summer 106' to produce Unit Energy Combiner (22) "y" component $\bar{y}_j$.

In Unit Energy Combiner 22 the weights u and w are constants set by the user. Referring to FIG. 2 these weights are selected so that the bleed-through path of (x$_j$,y$_j$) provides sufficient gain for cases in which a communications signal is equal to or is stronger than present interfering signals. Optimal values for these weight coefficients can be found through experimentation; however, for VLF applications the values of u=1 and w=4 provides good results.

The principle of operation of the operation will now be described. This principle is that the formation of the sum of ΔΘ$_j$–ΔΘ$_k$ over the index k estimates the signed magnitude of a component of the communication signal phase-difference that is either 90° or 270° out-of-phase with present interference. Estimation of this component of the communication signal is sufficient to allow high quality reception of a spread spectrum radio signal.

Figure 9:
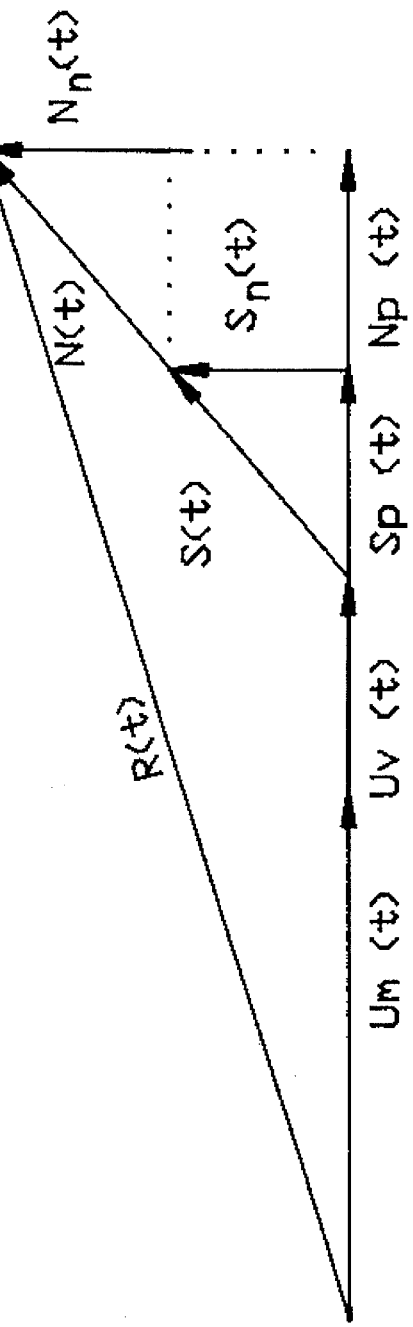
FIG. 9 is a vector interpretation of interference, communication and Gaussian noise components of a received signal.

Referring now to FIG. 9 the baseband expression of a received signal R(t) is assumed to have the following form:

$$R(t)=U(t)+S(t)+N(t),$$

where U(t) denotes an interference component, S(t) indicates a communication signal component and N(t) indicates a Gaussian noise component of a received signal. All these functions are complex-valued and can be viewed as vectors.

The vectors U(t), S(t) and N(t) can be decomposed into components defined to allow an estimation of the output of the phase-difference filter of the invention. The appropriate components are shown in FIG. 9 and are defined in the following paragraphs.

Vector U(t) is decomposed into the sum of two parallel vectors. One represents the average length of U(t), U$_m$(t) and the other vector represents its variable component U$_v$(t).

The communication signal and Gaussian noise vectors, S(t) and U(t), can be decomposed into vectors parallel to U(t), i.e. S$_p$(t) and U$_p$(t) as well as vectors normal to U(t), i.e. S$_n$(t) and N$_n$(t).

Let s$_p$(t)=U(t)°S(t)/||U(t)|| and n$_p$(t)=U(t)°N(t)/||U(t)|| denote the signed magnitude of the projection of the signals S(t) and N(t) onto interference component U(t). The symbol "°" denotes a dot product. Similarly, let s$_n$(t)=U$_r$(t)°S(t)/||U$_r$(t)|| and n$_n$(t)=U$_r$(t)°N(t)/||U$_r$(t)|| denote the signed magnitude of the projection of the signals S(t) and N(t) onto the interference component U(t) rotated counterclockwise through 90°.

The basic observation leading to the invention is the following. If ||U(t)||>>||S(t)|| and ||U(t)||>>||N(t)|| then the phase difference ΔΘ between received vectors R(t+T) and R(t) is related to the signal and noise components s$_n$ and n$_n$ in the following manner:

ΔΘ≈[s$_n$(t+T)–s$_n$(t)+n$_n$(t+T)–n$_n$(t)]/||R(t)|| where T=the time between the two samples used for the calculation of ΔΘ. This indicates that the phase-differences contain information about the communication component of the signal vector that is nodal to the interference vector. It has been found that the output of the phase-difference filter of the invention provides an estimate related to S$_n$(t).

The phase-difference interference filter of the invention is usable when interference dominates communication signals and Gaussian noise. In this case the information contained in the phase-differences of the received signal is information on s$_n$(t). An explanation will now be made as to how the phase-difference filter of the invention extracts this information.

Th $$\sum_k [\Delta\theta_j - \Delta\theta_k]$$

formed by the phase-difference filter is essentially $$\sum_k [(s_{nj} + u_{vj} + n_{nj})/r_j - (s_{nk} + u_{vk} + n_{nk})/r_j] =$$

$$(2n)\,(s_{nj} + u_{vj} + n_{nj})/r_j - \sum_k [s_{nk} + u_{vk} + n_{nk})/r_j].$$

This indicates the contribution of the j-th term is enhanced by a factor of 2n relative to the factors for indices other than j. Further, because the vectors s$_{nk}$, and u$_{vk}$ and n$_{nk}$ are in most cases equally likely to be either positive or negative they therefore tend to cancel one another. The gain factor g(ΔΘ$_j$) is the sum divided by 2n. For the invention to work well, n needs to be at least 2 and best performance can be expected for n equal to at least 4 or 8. The Phase-difference Interference Filter of the invention essentially removes U$_m$(t), the bulk of the interference signal.

Even a modest amount of bandspreading of the communication signal will provide sufficient processing gain to extract the signal from s$_{nj}$+u$_{vj}$+n$_{nj}$]. Thus the Phase-difference Filter of the invention allows the radio to be used in the presence of strong levels of narrowband interference.

Figure 10:
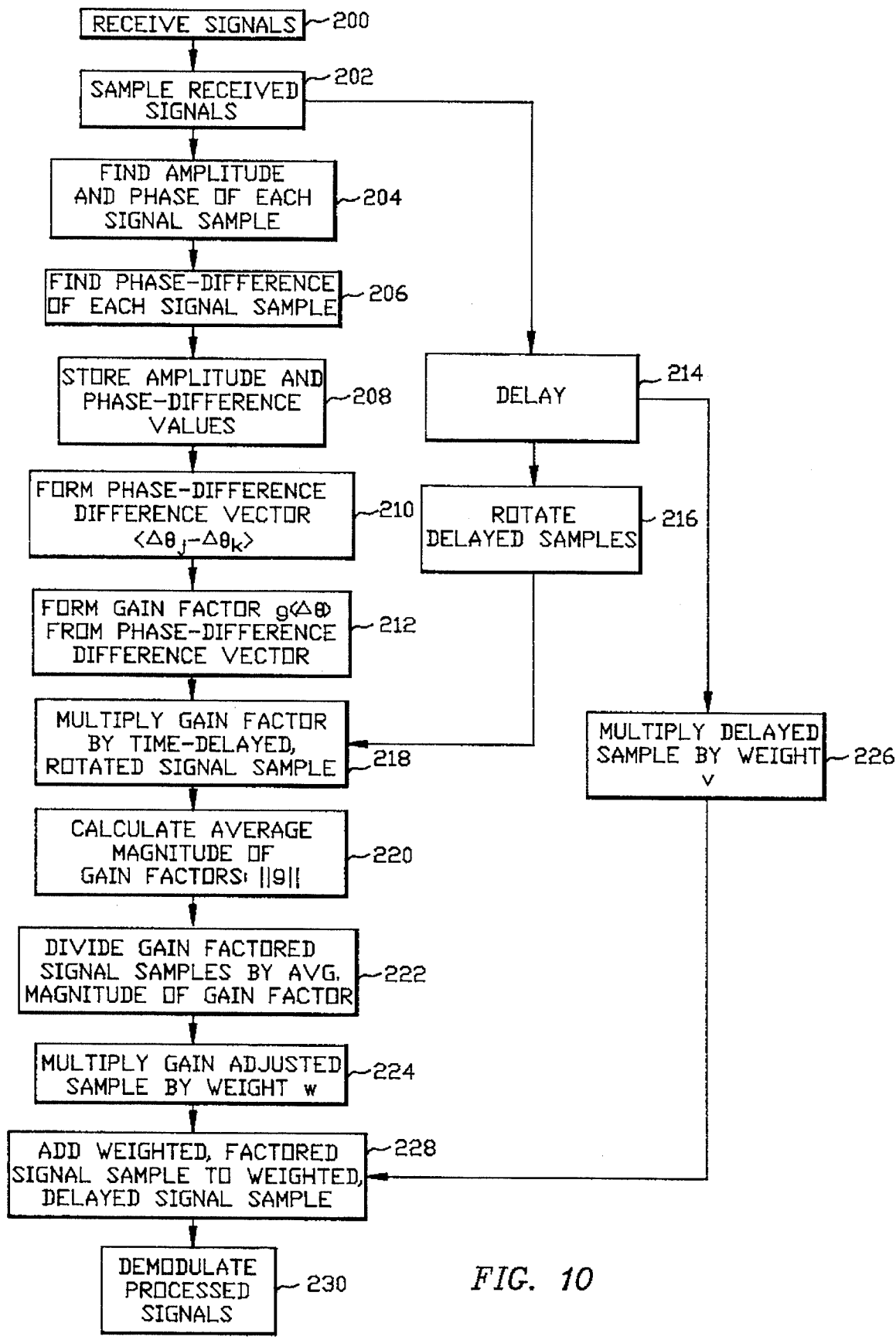
FIG. 10 is a flow chart describing various processing steps such as those that take place in a representative embodiment of the invention.

Referring now to FIG. 10 a flow chart is presented to illustrate the process utilizing the Phase-difference Filter of the invention. Referring to this figure in conjunction with FIGS. 1 and 2, the process of the invention begins by receiving signals in step 200. These signals, such as radio frequency signals, are received by radio receiver 12 of FIG. 1. The received signals are then sampled in step 202 within receiver 12. The process of the invention is then used to calculate the amplitude and phase of each signal sample. This is shown as step 204 and takes place in Coordinate Transformer 32 of FIG. 2.

The process of the invention continues with the determination of phase-differences corresponding to each signal sample. This is shown as step 206 and takes place within Coordinate Transformer 32 of FIG. 2. In step 208 the amplitude and phase-difference values are stored. This occurs jointly in delay 20 and Serial-to-parallel Converter 34 of FIG. 2. The phase-difference difference vector $<\Delta\Theta_j - \Delta\Theta_k>$ is formed in step 210 and takes place in Serial-to-parallel Converter 34. Gain Factor $g(\Delta\Theta_j)$ is then formed from the phase-difference difference vector. This is shown as step 212 and takes place within Phase-difference Difference Calculator 36.

While steps 204 through 212 take place the receive signal samples from step 202 are delayed sufficiently, step 214, to permit processing of the corresponding samples through the invention. In step 216 the delayed samples are rotated in Phase-difference Filter Applier 40. In step 218 Gain Factor $g(\Delta\Theta_j)$ is multiplied times the time-delayed rotated signal sample from step 216. This takes place within Phase-difference Filter Applier 40.

In step 220 the gain factor average magnitude is calculated, this taking place in Gain Factor Averager 38 of FIG. 2. In Unit Energy Combiner 22, the gain factored signal samples from step 218 are divide by the gain factor average magnitude calculated in step 220. This occurs as step 222. The gain adjusted sample is then multiplied by weight w, also taking place in Unit Energy Combiner 22, in step 224. In step 226 the delayed samples from delay step 216 are multiplied by weight v within Unit Energy Combiner 22. The "w" weighted signal sample is then added to the "v" delayed signal sample in step 228, this taking place within Unit Energy Combiner 22. Finally, the process signals are demodulated in step 230 in radio demodulator 14 to make the process signal usable to a listener.

The invention estimates phase change by $\Delta\Theta_j$ which constitutes a one-sided estimate of phase change. As an alternative embodiment to the invention, a two-sided estimate could be obtained if instead of $\Delta\Theta_j$ the quantity $\Delta^\wedge\Theta_j$ was used where:

$$\Delta^\wedge\Theta_j = (\Theta_j - \Theta_{j-d}) + (\Theta_j - \Theta_{j+d}).$$

The Coordinate Transformer would need to be changed to output this quantity; however, the rest of the invention would remain the same.

As a further alternative an asymmetric phase-difference filter could be obtained by running the phase-difference summation over magnitudes earlier than the most recent sample.

This means that:

$$g(\Delta\theta_j) = \sum_k |\Delta\theta_j - \Delta\theta_k|/n$$

where $k=j-1, j-2, \ldots j-n$ instead of running from $k=j-n$ to $k=j+n$ and then dividing the summation by $2n$. For this alternative design there would be very little processing delay introduced by the phase-difference filtering. More generally the summation may be run over any n consecutive samples which include the k-th sample.

Obviously, many modifications and variations of the present invention are possible in the light of the above teachings. It is therefore to be understood that within the scope of the appended claims, the invention may be practiced otherwise than as has been specifically described.

What is claimed is:

1. A method comprising the steps of:

receiving signals;

sampling said signals to get signal samples;

finding a magnitude value for each of said signal samples resulting in magnitude values equal in number to said signal samples;

finding a phase value for each of said signal samples resulting in phase values equal in number to said signal samples;

calculating a phase-difference value for each of said signal samples, resulting in phase-difference values equal in number to said signal samples, and designating one of said phase-difference values as a reference phase-difference value, said phase-difference values being calculated as the difference between the phase of each signal sample and the phase of a previous signal sample;

storing said magnitude values and said phase-difference values;

computing differences between said reference phase-difference value and said stored phase-difference values;

forming a sum of said differences to form a gain factor;

forming rotated signal samples by rotating each signal sample ninety degrees counter-clockwise;

multiplying said gain factor times each of said rotated signal samples to obtain gain factor adjusted signal samples; and inserting said gain factor adjusted signal samples into a demodulator.

2. The method of claim 1 in which said magnitude value is signal amplitude.

3. The method of claim 1 in which said signals are radio frequency signals.

4. The method of claim 3 in which said signal samples are baseband signal samples.

5. A method comprising the steps of:

receiving signals;

sampling said signals to get a sequence of signal samples;

finding a magnitude value for each of said signal samples of said sequence of signal samples resulting in magnitude values equal in number to said signal samples;

finding a phase value for each of said signal samples of said sequence of signal samples resulting in phase values equal in number to said signal samples;

calculating a phase-difference value for each of said signal samples of said sequence of signal samples, resulting in phase-difference values equal in number to said signal samples, and designating one of said phase-difference values as a reference phase-difference value, said phase-difference values being calculated as the difference between the phase of each signal sample of said sequence of signal samples and the phase of a previous signal sample;

storing said magnitude values and phase-difference values;

computing differences between said reference phase-difference value and said stored phase-difference values;

forming a sum of said differences to form a gain factor;

forming rotated signal samples by rotating each signal sample of said sequence of signal samples by ninety degrees counter-clockwise;

multiplying said gain factor times each of said rotated signal samples to obtain gain factor adjusted signal samples;

repeating said steps of receiving said signals, sampling said signals, finding magnitude values of said signal samples, finding phase values of said signal samples, calculating phase-difference values for each of said signal samples and designating one of said phase difference values as a reference phase-difference value, storing said magnitude values and said phase-difference values, computing differences between said reference phase-difference value and said stored phase-difference values, forming a sum of said differences to form a gain factor, forming rotated signal samples and multiplying said gain factor times each of said rotated signal samples to obtain gain factor adjusted signal samples, a preselected number of times to form a number of gain factors;

averaging the gain factors formed to get an averaged magnitude gain factor;

dividing each of said gain factor adjusted signal samples by said averaged magnitude gain factor to get averaged gain factored signal samples;

multiplying said averaged gain factored signal samples and said signal samples by respective weights to obtain weighted gain factor adjusted signal samples and weighted signal samples;

forming a sum of said weighted gain factor adjusted signal samples and said weighted signal samples; and inserting said sum into a demodulator.

6. The method of claim 5 in which said signal magnitude value is signal amplitude.

7. The method of claim 5 in which said signals are radio frequency signals.

8. The method of claim 7 in which said signal samples are baseband signal samples.

* * * * *